United States Patent
Feria et al.

(10) Patent No.: US 6,763,242 B1
(45) Date of Patent: Jul. 13, 2004

(54) RESOURCE ASSIGNMENT SYSTEM AND METHOD FOR DETERMINING THE SAME

(75) Inventors: Ying Feria, Manhattan Beach, CA (US); Ming Chang, Rancho Palos Veredes, CA (US); Donald C. D. Chang, Thousand Oaks, CA (US); Frank A. Hagen, Palos Verdes Estates, CA (US); Alan Cha, Glendale, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 399 days.

(21) Appl. No.: 09/661,726

(22) Filed: Sep. 14, 2000

(51) Int. Cl.$^7$ ................................................. H04B 7/00
(52) U.S. Cl. ..................... 455/509; 455/12.1; 455/63; 455/427; 455/430; 455/501
(58) Field of Search ............................. 455/509, 3.03, 455/422, 427, 429, 430, 443, 12.1, 13.1, 13.2, 501, 63, 67, 370, 226.1, 296, 307

(56) References Cited

U.S. PATENT DOCUMENTS

| | | | |
|---|---|---|---|
| 3,384,891 A | 5/1968 | Anderson | 343/100 |
| 3,544,995 A | 12/1970 | Bottenburg et al. | 343/6 |
| 4,613,864 A | 9/1986 | Hofgen | |
| 4,799,065 A | 1/1989 | Thompson | |
| 4,819,227 A | 4/1989 | Rosen | 370/75 |
| 4,823,341 A | 4/1989 | Rosen | |
| 4,979,170 A | 12/1990 | Gilhousen et al. | 370/104.1 |
| 5,006,855 A | 4/1991 | Braff | |
| 5,077,562 A | 12/1991 | Chang et al. | |
| 5,081,464 A | 1/1992 | Renshaw | |
| 5,151,706 A | 9/1992 | Roederer et al. | |
| 5,218,619 A | 6/1993 | Dent | |
| 5,233,626 A | 8/1993 | Ames | 375/1 |
| 5,278,863 A | 1/1994 | Briskman | 375/1 |

(List continued on next page.)

FOREIGN PATENT DOCUMENTS

| | | |
|---|---|---|
| EP | 0 549 220 A2 | 6/1993 |
| EP | 0682 416 A2 | 11/1995 |
| EP | 0 749 252 A | 12/1996 |
| EP | 0776 099 A2 | 5/1997 |
| EP | 0 837 568 A2 | 4/1998 |
| EP | 0 845 874 A2 | 6/1998 |
| EP | 0 860 708 A | 8/1998 |
| EP | 0 860 710 A2 | 8/1998 |

(List continued on next page.)

OTHER PUBLICATIONS

U.S. patent application Ser. No. 09/611,753, Chang et al., filed Jul., 7, 2000.
Casewell I.E., "The provision of GSM cellular radio environments within passenger aircraft operating over Europe", Racal Res. Ltd., Walton–on Thames, Mobile Radio and Personal Communications, 1989, Fifth International Conference, Dec. 11, 1989–Dec. 14, 1989, pp. 172–176.

(List continued on next page.)

*Primary Examiner*—Cong Van Tran
(74) *Attorney, Agent, or Firm*—Georgann S. Grunebach; John A. Crook, III

(57) ABSTRACT

A communications system and method of operating the communications system includes a high altitude communication device that communicates with a plurality of user terminals and a gateway station. The gateway station couples the users to terrestrial networks and other users. The high altitude communication device has gateway station that assigns a first code to a beam of a first plurality of users. The gateway station continually determines whether an interference occurs between the first beam and the second beam by determining whether the first interference contour intersects the second interference contour when the first interference contour intersects the second interference contour. The gateway station declares an interference when the contours intersect and reassigns a second resource to the first beam.

19 Claims, 2 Drawing Sheets

U.S. PATENT DOCUMENTS

| | | | |
|---|---|---|---|
| 5,319,673 A | 6/1994 | Briskman | 375/1 |
| 5,327,455 A | 7/1994 | De Gaudenzi et al. | |
| 5,379,320 A | 1/1995 | Fernandes et al. | |
| 5,423,059 A | 6/1995 | LoGalbo et al. | |
| 5,444,450 A | 8/1995 | Olds et al. | |
| 5,475,520 A | 12/1995 | Wissinger | |
| 5,485,485 A | 1/1996 | Briskman et al. | 375/200 |
| 5,550,809 A | 8/1996 | Bottomley et al. | |
| 5,555,257 A | 9/1996 | Dent | |
| 5,555,444 A | 9/1996 | Diekelman et al. | |
| 5,572,216 A | 11/1996 | Weinberg et al. | 342/357 |
| 5,589,834 A | 12/1996 | Weinberg et al. | |
| 5,592,471 A | 1/1997 | Briskman | 455/52.3 |
| 5,594,941 A | 1/1997 | Dent | |
| 5,612,701 A | 3/1997 | Dickelman | 342/354 |
| 5,644,572 A | 7/1997 | Olds et al. | 370/324 |
| 5,732,351 A | 3/1998 | Olds et al. | |
| 5,754,139 A | 5/1998 | Turcotte et al. | |
| 5,764,188 A | 6/1998 | Ghosh et al. | |
| 5,790,070 A | 8/1998 | Natarajan et al. | 342/354 |
| 5,810,284 A | 9/1998 | Hibbs et al. | 244/13 |
| 5,839,053 A | 11/1998 | Bosch et al. | |
| 5,856,804 A | 1/1999 | Turcotte et al. | 342/371 |
| 5,862,480 A | 1/1999 | Wild et al. | |
| 5,864,579 A | 1/1999 | Briskman | 375/200 |
| 5,867,109 A | 2/1999 | Wiedeman | |
| 5,878,034 A | 3/1999 | Hershey et al. | |
| 5,903,549 A | 5/1999 | Von Der Embse et al. | 370/310 |
| 5,907,813 A | 5/1999 | Johnson, Jr. et al. | |
| 5,907,816 A | 5/1999 | Newman et al. | |
| 5,909,460 A | 6/1999 | Dent | |
| 5,918,157 A | 6/1999 | Wiedeman et al. | |
| 5,920,284 A | 7/1999 | Victor | |
| 5,937,332 A | 8/1999 | Karabinis | |
| 5,944,770 A | 8/1999 | Enge et al. | |
| 5,945,948 A | 8/1999 | Buford et al. | |
| 5,946,625 A | 8/1999 | Hassan et al. | |
| 5,949,766 A | 9/1999 | Ibanez-Meier et al. | 370/316 |
| 5,956,619 A | 9/1999 | Gallagher et al. | |
| 5,966,371 A | 10/1999 | Sherman | |
| 5,969,674 A | 10/1999 | Von Der Embse et al. | 342/357.16 |
| 5,974,039 A | 10/1999 | Schilling | |
| 5,974,317 A | 10/1999 | Djuknic et al. | |
| 5,974,324 A | 10/1999 | Henson | |
| 5,982,337 A | 11/1999 | Newman et al. | |
| 5,990,928 A | 11/1999 | Sklar et al. | |
| 6,002,935 A | 12/1999 | Wang | |
| 6,014,372 A | 1/2000 | Kent et al. | |
| 6,016,124 A | 1/2000 | Lo et al. | |
| 6,018,316 A | 1/2000 | Rudish et al. | |
| 6,020,845 A | 2/2000 | Weinberg et al. | |
| 6,023,463 A * | 2/2000 | Wiedeman et al. | 370/344 |
| 6,028,884 A | 2/2000 | Silberger et al. | |
| 6,032,041 A | 2/2000 | Wainfan et al. | |
| 6,047,186 A | 4/2000 | Yu et al. | |
| 6,061,562 A | 5/2000 | Martin et al. | |
| 6,072,986 A | 6/2000 | Blanchard et al. | |
| 6,088,341 A | 7/2000 | Hinedi et al. | |
| 6,104,911 A | 8/2000 | Diekelman | |
| 6,111,542 A | 8/2000 | Day et al. | 342/359 |
| 6,138,012 A | 10/2000 | Krutz et al. | 455/427 |
| 6,150,977 A | 11/2000 | Wilcoxson et al. | |
| 6,151,308 A | 11/2000 | Ibanez-Meier et al. | 370/316 |
| 6,157,621 A | 12/2000 | Brown et al. | |
| 6,167,263 A | 12/2000 | Campbell | |
| 6,169,910 B1 | 1/2001 | Tamil et al. | |
| 6,173,178 B1 | 1/2001 | Hammill et al. | |
| 6,176,451 B1 | 1/2001 | Drymon | |
| 6,178,328 B1 | 1/2001 | Tang et al. | |
| 6,188,896 B1 | 2/2001 | Perahia et al. | |
| 6,195,555 B1 | 2/2001 | Dent | |
| 6,198,920 B1 | 3/2001 | Doviak et al. | |
| 6,201,797 B1 | 3/2001 | Leuca et al. | |
| 6,205,320 B1 | 3/2001 | Coleman | |
| 6,208,858 B1 | 3/2001 | Antonio et al. | |
| 6,236,834 B1 | 5/2001 | Poskett et al. | |
| 6,240,072 B1 | 5/2001 | Lo et al. | |
| 6,272,317 B1 | 8/2001 | Houston et al. | |
| 6,295,440 B2 | 9/2001 | Chang et al. | |
| 6,308,045 B1 | 10/2001 | Wright et al. | |
| 6,311,068 B1 | 10/2001 | Leung et al. | |
| 6,314,269 B1 | 11/2001 | Hart et al. | |
| 6,317,412 B1 | 11/2001 | Natali et al. | |
| 6,317,420 B1 | 11/2001 | Schiff | |
| 6,324,398 B1 | 11/2001 | Lanzerotti et al. | |
| 6,337,980 B1 | 1/2002 | Chang et al. | |
| 6,339,611 B1 | 1/2002 | Antonio et al. | |
| 6,339,708 B1 | 1/2002 | Wang | |
| 6,366,256 B1 | 4/2002 | Ramanujam et al. | |
| 6,366,761 B1 | 4/2002 | Montpetit | |
| 6,374,080 B2 | 4/2002 | Uchida | |
| 6,380,893 B1 | 4/2002 | Chang et al. | |
| 6,381,228 B1 | 4/2002 | Prieto, Jr. et al. | |
| 6,385,434 B1 | 5/2002 | Chuprun et al. | |
| 6,388,615 B1 * | 5/2002 | Chang et al. | 342/368 |
| 6,396,819 B1 | 5/2002 | Fleeter et al. | |
| 6,408,180 B1 | 6/2002 | McKenna et al. | |
| 6,414,646 B2 | 7/2002 | Luh | |
| 6,424,831 B1 | 7/2002 | Schiff | |
| 6,434,384 B1 | 8/2002 | Norin et al. | |
| 6,438,379 B1 | 8/2002 | Gitlin et al. | |
| 6,452,962 B1 | 9/2002 | Linsky et al. | |
| 6,456,846 B2 | 9/2002 | Norin et al. | |
| 6,463,294 B1 | 10/2002 | Holma et al. | |
| 6,480,788 B2 | 11/2002 | Kilfeather et al. | |
| 6,501,941 B1 | 12/2002 | Chang et al. | |
| 6,507,739 B1 | 1/2003 | Gross et al. | |
| 6,513,758 B1 * | 2/2003 | Lloyd | 244/129.1 |
| 6,570,858 B1 | 5/2003 | Emmons, Jr. et al. | |
| 2001/0000167 A1 | 4/2001 | Chang et al. | |
| 2001/0045903 A1 | 11/2001 | Chang et al. | |
| 2001/0048389 A1 | 12/2001 | Nakagawa | |
| 2002/0006795 A1 | 1/2002 | Norin | |
| 2002/0010604 A1 | 1/2002 | Chang et al. | |
| 2002/0041575 A1 * | 4/2002 | Karabinis et al. | 370/319 |
| 2002/0050946 A1 | 5/2002 | Chang et al. | |
| 2002/0072332 A1 | 6/2002 | Chang et al. | |
| 2002/0072360 A1 | 6/2002 | Chang et al. | |
| 2002/0072361 A1 | 6/2002 | Knoblach et al. | |
| 2002/0072374 A1 | 6/2002 | Chang et al. | |
| 2002/0073437 A1 | 6/2002 | Chang et al. | |
| 2002/0080732 A1 | 6/2002 | Feria et al. | |
| 2002/0081969 A1 | 6/2002 | Chang et al. | |
| 2002/0107034 A1 * | 8/2002 | Chang et al. | 455/456 |
| 2002/0118654 A1 | 8/2002 | Chang et al. | |
| 2002/0126042 A1 | 9/2002 | Chang et al. | |
| 2002/0128045 A1 * | 9/2002 | Chang et al. | 455/562 |
| 2002/0146058 A1 | 10/2002 | Feria et al. | |
| 2002/0150067 A1 | 10/2002 | Feria et al. | |
| 2002/0168991 A1 * | 11/2002 | Kochanski et al. | 455/505 |

FOREIGN PATENT DOCUMENTS

| | | |
|---|---|---|
| EP | 0 860 952 A | 8/1998 |
| EP | 1 037 403 A2 | 9/2000 |
| EP | 1 139 583 A2 | 10/2001 |
| EP | 1 148 662 A2 | 10/2001 |
| EP | 1 158 698 A2 | 11/2001 |
| EP | 1 161 001 A2 | 12/2001 |
| GB | 2 349 045 | 10/2000 |
| JP | 2001345747 A | 12/2001 |

| | | |
|---|---|---|
| WO | WO 90/13186 | 11/1990 |
| WO | WO 96/22661 | 7/1996 |
| WO | WO 96/31016 | 10/1996 |
| WO | WO 97 07609 A | 2/1997 |
| WO | WO 9851568 A | 11/1998 |
| WO | WO 99/13598 | 3/1999 |
| WO | WO 99/23769 | 5/1999 |
| WO | WO 01/91310 A3 | 11/2001 |
| WO | WO 01/93458 A2 | 12/2001 |
| WO | WO 01/94969 A2 | 12/2001 |

OTHER PUBLICATIONS

Divsalar et al., "Trellis Coded MPSK Modulation Techniques for MSAT–X", Proceedings of the Mobile Satellite Conference, May 3–5, 1988, NASA, JPL Publication 988–9, pp. 283–290.

Agnew et al., "The AMSC Mobile Satellite System", Proceedings of the Mobile Satellite Conference, May 3–5, 1988, NASA, JPL Publication 988–9, pp. 3–9.

Colella, Nicholas J. et al., "The HALO Network™", IEEE Communciations Magazine, Jun. 2000, pp. 142–148.

H. D. Griffiths et al., "Bistatic Radar Using Satellite–Borne Illuminators Of Opportunity", IEEE, Radar 92, International Conference, Brighton, UK, 1992, pp. 276–279.

Colella, Nicholas J. et al., "High Speed Internet Access via Stratospheric HALO Aircraft", INET 99 Proceedings, Internet Society, Technology, Wireless, 13 pages, Jun. 8, 1999.

Sakakibara, Kunio et al, "A Two–Beam Slotted Leaky Waveguide Array for Mobile Reception of Dual–Polarization DBS", IEEE Transactions on Vehicular Technology, vol. 48, No. 1, Jan. 1999, pp. 1–7.

Miura, Ryu et. al, "A DBF Self–Beam Steering Array Antenna for Mobile Satellite Applications Using Beam–Space Maximal–Ratio Combination", IEEE Trans. On Vehicular Technology, vol. 48, No. 3, May 1999, pp. 665–675.

Sato, Kazuo et al., "Development And Field Experiments of Phased Array Antenna For Land Vehicle Satellite Communications", IEEE Antennas and Propagation Society International Symposium, 1992, Jul. 1992, pp. 1073–1076.

Suzuki, R. et. al, :Mobile TDM/TDMA System With Active Array Antenna, Global Telecommunications Conference, 1991; Globecom '91, vol. 3, Dec. 2–5, 1991, pp. 1569–1573.

Chiba, Isamu et. al, "Digital Beam Forming (DBF) Antenna System for Mobile Communications", IEEE AES Systems Magazine, Sep. 1997, pp. 31–41.

U.S. patent application Ser. No. 09/271,997, Chang et al., filed Mar. 18, 1999.

U.S. patent application Ser. No. 09/550,505, Chang et al., filed Apr. 17, 2000.

U.S. patent application Ser. No. 09/735,861, Feria et al., filed Dec. 12, 2000.

U.S. patent application Ser. No. 09/588,395, Chang et al., filed Jun. 6, 2000.

U.S. patent application Ser. No. 09/587,758, Chang et al., filed Jun. 6, 2000.

U.S. patent application Ser. No. 09/669,095, Yung et al., filed Sep. 25, 2000.

U.S. patent application Ser. No. 09/661,726, Feria et al., filed Sep. 14, 2000.

K. K. Chan, et al., "A Circularly Polarized Waveguide Array for Leo Satellite Communications", Antennas and Propagation Society, 1999, IEEE International Symposium, vol. 1, Jul. 11–16, 1999, pp. 154–157.

M. Oodo, et al, "Onboard DBF Antenna for Stratospheric Platform", 2000 IEEE International Conference on Phased Array Systems and Technology, Proceedings, May 21–25, 2000, pp. 125–128.

Yokosuka Research Park, "The First Stratospheric Platform Systems Workshop", May 12–13, 1999, pp 1–216.

* cited by examiner

RESOURCE ASSIGNMENT SYSTEM AND METHOD FOR DETERMINING THE SAME

TECHNICAL FIELD

The present invention relates generally to communications systems, and more particularly, to an assignment system for assigning users system resource s particularly suitable for mobile applications.

BACKGROUND ART

In this communication age, content providers are increasingly investigating ways in which to provide more content to users as well as interfacing with users.

Communication satellites have become commonplace for use in many types of communication services, e.g., data transfer, voice communications, television spot beam coverage, and other data transfer applications. As such, satellites transmit and receive large amounts of signals used in either a "bent pipe" or "spot array" configuration to transmit signals to desired geographic locations on the earth.

Because the frequency of resources is scarce for over-the-air transmission, various encoding schemes are used to provide a greater number of communication signals within an allocated communication band. Such encoding schemes include code division multiple access (CDMA), time division multiple access (TDMA), frequency division multiple access (FDMA), or combination of these schemes. Further, to prevent interference the schemes may operate at various frequencies.

CDMA systems are commonly used in mobile applications. In the mobile applications a plurality of base stations are positioned to provide coverage for a cell of a service area. Each of the base stations has a plurality of orthogonal codes that are used in each base station. The same group of orthogonal codes are reused in a cell covered by another base station a predetermined distance away. No central code management resource is needed because the base station with the same orthogonal codes is located sufficient distance so that interference does not occur. As the mobile user travels throughout the service area, frequency switching must occur often as the user travels into the range of another base station. Frequency switching may cause inconvenience such as discontinuity during switching time. Also, the additional signaling required for frequency switching adds to higher overhead in the system.

It would therefore be desirable to provide a resource assignment scheme that reduces the amount of switching of users.

SUMMARY OF THE INVENTION

It is therefore one object of the invention to provide an improved resource assignment scheme that reduces switching of resources between users while allowing an increased number of users.

In one aspect of the invention, a method for operating a communication system comprises the steps of:

assigning a first resource to a first beam of a first mobile user, defining a first interference contour around said first mobile user;

assigning a first resource to a second beam of a second user;

defining a second interference contour around said second user;

moving the first beam and first interference contour with the mobile user;

continually determining whether an interference occurs between the first beam and the second beam by determining whether the first interference contour intersects the second interference contour; and, when the first interference contour intersects the second interference contour, declaring an interference and reassigning a second resource to the first beam.

In a further aspect of the invention, a communications system includes a high altitude communication device that communicates with a plurality of user terminals and a gateway station. The gateway station couples the users to terrestrial networks and other users. The high altitude communication device has gateway station that assigns a first code to a beam of a first plurality of users. The gateway station continually determines whether an interference occurs between the first beam and the second beam by determining whether the first interference contour intersects the second interference contour when an the first interference contour intersects the second interference contour. The gateway declares an interference when the contours intersect and reassigns a second resource to the first beam.

One advantage of the invention is that the complexity of the overall system is reduced and thereby the overall system cost is reduced. By reducing the complexity the weight of the payload for the high altitude communications device is also reduced.

Other objects and features of the present invention will become apparent when viewed in light of the detailed description of the preferred embodiment when taken in conjunction with the attached drawings and appended claims.

BEST MODES FOR CARRYING OUT THE INVENTION

Figure 1:
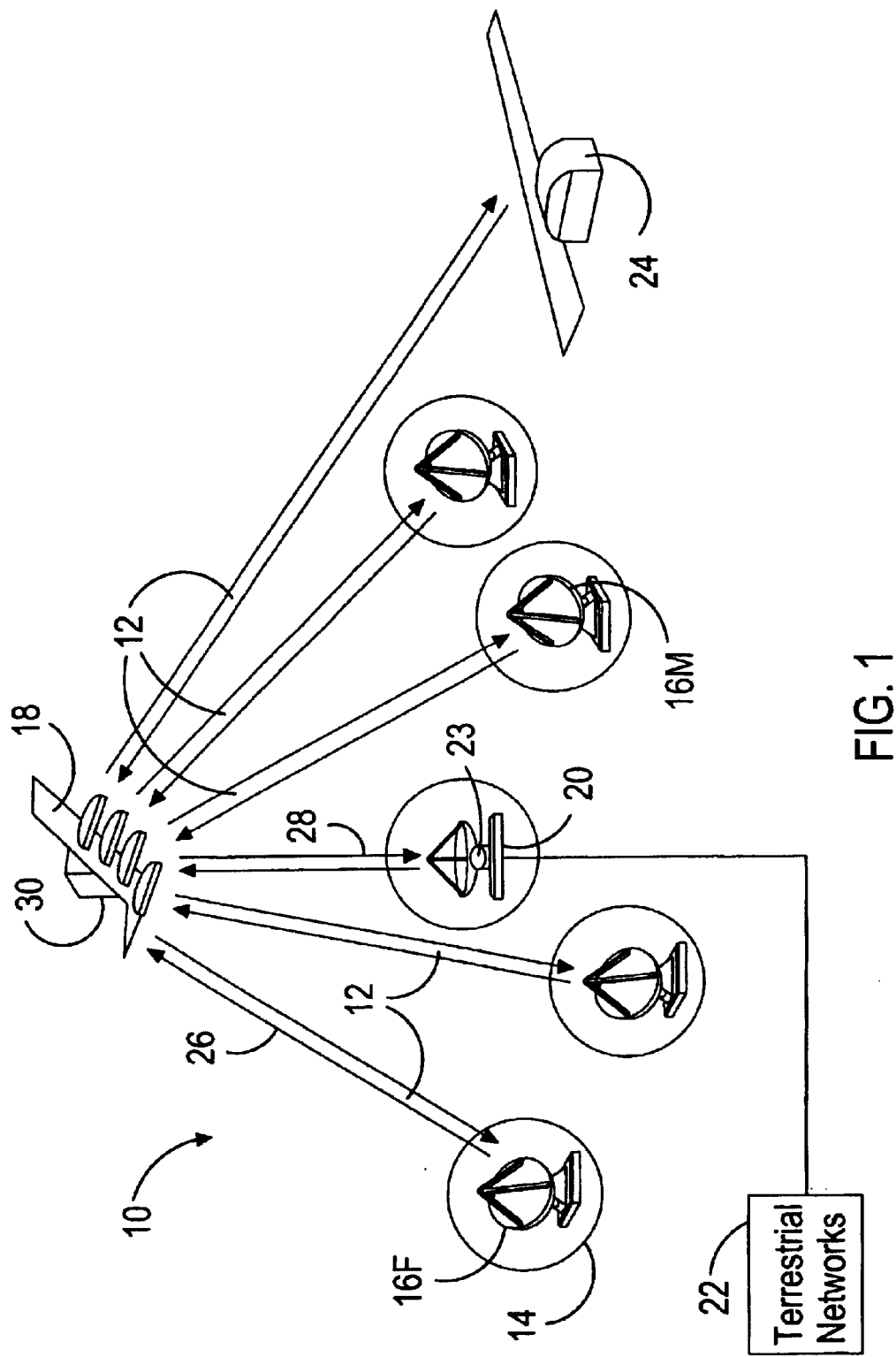
FIG. 1 is a system diagram of a preferred embodiment in the invention.

In the following description, the same reference numerals are used to identify the same components in the various views. Those skilled in the art will recognize that various other embodiments, structural changes and changes in measures may be made without departing from the scope of the invention.

Referring now to FIG. 1, a communications system 10 has a plurality of beams 12 that are illustrated as a plurality of circles 14 on the earth's surface. Circles 14 represent the footprint of a radiated beam onto the earth's surface. As will be described below the beams preferably move with the users. A plurality of user terminals 16M and 16F are used to illustrate mobile users and fixed users, respectively. Mobile users 16M may comprise but are not limited to automotive applications, personal digital assistant applications and cellular phone applications. Fixed user terminals 16F may, for example, comprise business-based or consumer-based communication systems. Each user terminal 16F and 16M may receive a signal with the predetermined signal strength from a spot beam pattern that is radiated from stratospheric platform 18. The present invention is particularly advantageous for use with mobile terminals 16M.

Communication system 10 further includes a gateway station 20 that is coupled to terrestrial networks 22. Communication system may also include a platform operations center 24. Both gateway station 20 and platform operations center 24 are in communication with stratospheric platform 18. Gateway station 20 provides a link between user terminals 16F, 16M and terrestrial networks 22 through stratospheric platforms 18. Platform operation center 24 provides command and control functions to communications platform 18. Although illustrated as two separate units, gateway station 20 and platform operation center 24 may be combined into the same physical location.

The communication signals between stratospheric platform 18 and user terminals 16M and 16F may be referred to as user links 26. User links 26 represent the transmit and receive beams from both categories of user terminals 16F, 16M and high altitude communications platform 18. A feeder link 28 is defined between high altitude communications platform 18 and gateway station 20.

High altitude communications platform 18 is preferably a stratosphere-based platform such as those under development by AeroVironment. Helios is one such project being developed by AeroVironment and is an unmanned vehicle that can fly for several months at an altitude of over 60,000 feet above the earth. Helios is a solar-powered, electric plane that is modular in design and may be configured in a variety of ways. The stratospheric platform is operated through the platform operations center 24 to fly in a small radius flight path over a given spot on the earth. As far as users are concerned, the platform is geo-stationary. In addition to a plane-like platform, the stratospheric platform may comprise a balloon or blimp-like platforms.

Stratospheric platform 18 is used as a communication node for gateway station 20 and user terminals 16F and 16M, each of which have an antennas that are pointed in the direction of the high altitude communications platform 18. As will be described below, the pointing from mobile terminals 16M may be performed electronically. Although only one gateway station 20 is illustrated in the figure, those skilled in the art would recognize that various numbers of gateway stations may be employed. As would be further described below, gateway is station 20 with a high gain antenna that has a narrow beam width. The antenna may need a tracking mechanism with tracking speed adequate enough to maintain a communication link with the platform 18 throughout the flight path. Gateway station 20 may be coupled to terrestrial networks 22 such as the public service telephone network, the Internet, or an intranet. Gateway station 20 has communications processing facility 23 that controls the communication with the high altitude communications platform 18.

High altitude communications device 18 uses gateway station 20 to control communications with the user terminals 16F, 16M. In the following example, the controller of gateway station 20 is used to generate a plurality of beams in a code division multiple access system. In a code division multiple access system, each beam is assigned an orthogonal code. Various numbers of users may communicate within a beam. Typically, a predetermined number of codes are used over the service area. As will be further described below, the beams are assigned codes that do not interfere with adjacent beams. Upon the detection of an interference, the code may be switched for a particular beam and thus for a particular user. In the following description, the code referred to is an orthogonal code. However, various groups of orthogonal codes may be classified together as a single code for the purposes of the following description. The orthogonal code is just one example of a reassignable system resource. For example, frequency of the beam may also be a system resource.

Figure 2:
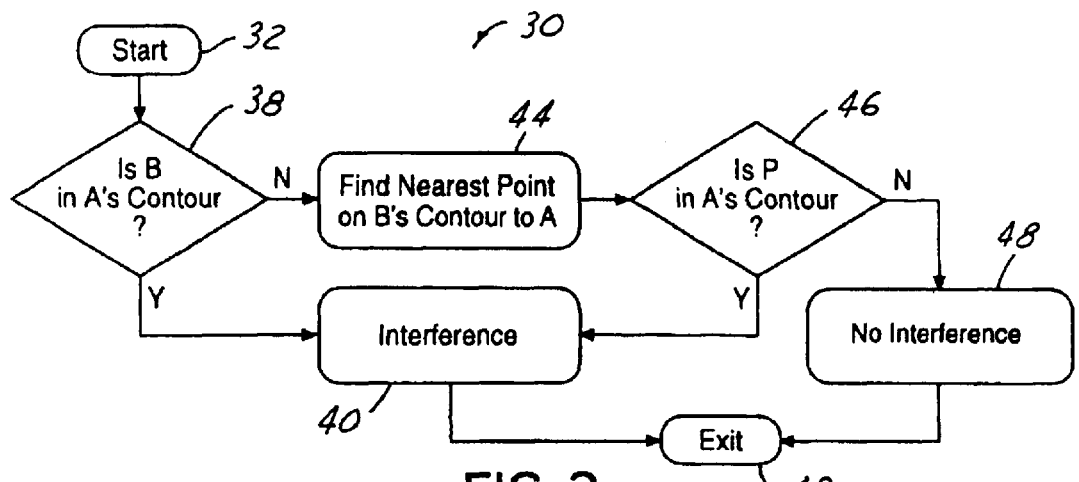
FIG. 2 is a flow chart of a preferred embodiment of the invention.
Figure 3:
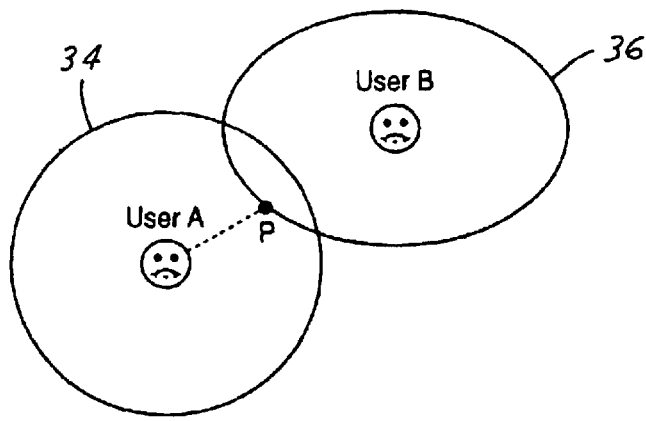
FIG. 3 is a diagrammatic view of two users during interference.
Figure 4:
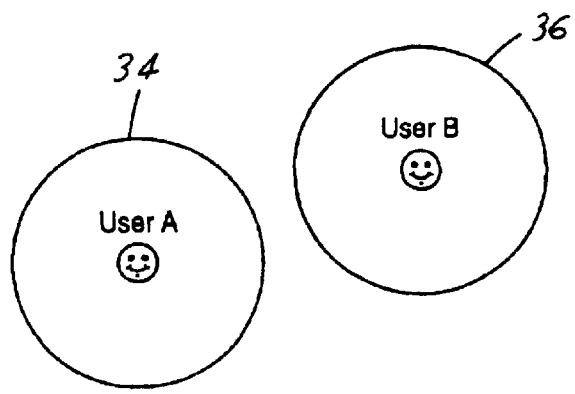
FIG. 4 is a diagrammatic view of two non-interfering users.

Referring now to FIGS. 2–4, a method 30 for determining whether interference occurs between two users is illustrated. Each user A and user B have an interference contour 34, 36, respectively, therearound. The user contour may, for example, correspond to a −10 dB drop from the center of the contour. In the preferred embodiment, the user is located at the center of the respective contour 34, 36. Generally, the method determines whether the contours 34, 36 intersect. In block 38, the position of user B is compared to the position of the contour of user A. If user B is within contour 34, interference is declared in step 40 and the process ends in exit step 42. When interference is declared then one user is changed to use another non-interfering system resource.

If user B is not within user A's contour 34, step 44 is executed. In step 44, the nearest point P to A is determined. This data may be derived because the position of the user beams is stored in user position files within the gateway station. After step 44, step 46 is executed in which it is determined whether point P is within the contour 34 of user A. If the point P is within A's contour 34, interference is declared in step 40. This situation is illustrated best in FIG. 3. In step 46, if the point P is not within contour 34, no interference is indicated in step 48 and the process is exited in step 42. Preferably, the process is continually repeated to insure that no interference between various users is obtained.

FIGS. 2, 3 and 4 are described with respect to two users in a system. However, a multitude of users would likely be present in any application. The method 30 of the present invention would thus be used between each of the various users to insure no interference is obtained between them.

Advantageously, the present invention provides a system that allows the user to maintain a resource assignment such as a code assignment until the code assignment interferes with another user. Thus, the controller of the gateway station may be reduced in size and complexity. This type of configuration is particularly suitable for high altitude communications devices such as satellites or stratospheric platforms. Also, only two code assignments have been illustrated. However, those skilled in the art will recognize more or a greater number of code assignments may be used. Thus, no predefined cells are present in the present invention.

While particular embodiments of the invention have been shown and described, numerous variations alternate embodiments will occur to those skilled in the art. Accordingly, it is intended that the invention be limited only in terms of the appended claims.

What is claimed is:

1. A method of operating a communication system comprising the steps of:

assigning a first resource to a first beam of a first mobile user, defining a first interference contour around said first mobile user;

assigning the first resource to a second beam of a second user;

defining a second interference contour around said second user;

moving the first beam and first interference contour with the mobile user;

continually determining whether an interference occurs between the first beam and the second beam by determining whether the first interference contour intersects the second interference contour; and, when the first interference contour intersects the second interference contour, declaring an interference and reassigning a second resource to the first beam.

2. A method as recited in claim 1 wherein said first interference contour corresponds to −10 dB contour from said first user.

3. A method as recited in claim 1 wherein said second interference contour corresponds to −10 dB from a second user.

4. A method as recited in claim 1 wherein said step of determining comprises the steps of determining whether the second user is inside the first interference contour.

5. A method as recited in claim 1 further comprising the step of when the second user is outside the first contour, determining a closest point between the second contour and the first mobile user; and determining whether the point is within the first interference contour; and wherein the step of declaring comprises declaring an interference when the point is within the first contour.

6. A method as recited in claim 1 wherein said first resource comprises a code.

7. A method as recited in claim 1 wherein said first resource comprises a frequency.

8. A communications system comprising:

a first mobile user device;

a second user device;

a high altitude communications device in communication with a first mobile user device and the second user device; and a gateway station assigns a first beam having a first resource to the first mobile user and assigns a second beam having the first resource to the second user, said gateway continually determining whether an interference occurs between the first beam and the second beam by determining whether the first interference contour intersects the second interference contour when an the first interference contour intersects the second interference contour, declaring an interference and reassigning a second resource to the first beam.

9. A system as recited in claim 8 wherein said high altitude communications device is selected from a satellite and a communications platform located in a stratospheric location.

10. A system as recited in claim 8 wherein said first interference contour corresponds to −10 dB contour from said first user.

11. A system as recited in claim 8 wherein said second interference contour corresponds to −10 dB from a second user.

12. A system as recited in claim 8 wherein said gateway station determines whether the second user is inside the first interference contour.

13. A system as recited in claim 12 wherein said gateway station determines when the second user is outside the first contour, determining a closest point between the second contour and the first mobile user; and determining whether the point is within the first interference contour; and wherein the step of declaring comprises declaring an interference when the point is within the first contour.

14. A method as recited in claim 8 wherein said first resource comprises a code.

15. A method as recited in claim 8 wherein said first resource comprises a frequency.

16. A method of operating a communications system comprising the steps of:

assigning a first resource to a first beam of a first mobile user, defining a first interference contour around said first mobile user;

assigning the first resource to a second beam of a second user;

defining a second interference contour around said second user;

moving the first beam and first interference contour with the mobile user;

determining whether the second user is inside the first interference contour;

declaring an interference when the second user is inside the first interference contour;

when the second user is outside the first contour, determining a closest point between the second contour and the first mobile user; and determining whether the closest point is within the first interference contour; and declaring an interference when the point is within the first contour; and, reassigning a second resource to the first beam.

17. A method as recited in claim 16 wherein said first interference contour corresponds to −10 dB contour from said first user.

18. A method as recited in claim 16 wherein said second interference contour corresponds to −10 dB from a second user.

19. A method as recited in claim 16 wherein said step of determining comprises the steps of determining whether the second user is inside the first interference contour.

* * * * *